US006404740B1

(12) United States Patent
Yoshida

(10) Patent No.: US 6,404,740 B1
(45) Date of Patent: Jun. 11, 2002

(54) SYSTEM FOR TESTING INTERNAL CONNECTIVITY IN ATM SWITCHING EQUIPMENT

(75) Inventor: Takao Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/059,829

(22) Filed: Apr. 14, 1998

(30) Foreign Application Priority Data

Oct. 17, 1997 (JP) .............................................. 9-284820

(51) Int. Cl.$^7$ .............................................. H04L 12/26
(52) U.S. Cl. .................................... 370/241.1; 370/249
(58) Field of Search ................................ 370/241, 242, 370/244, 246–247, 249, 250–252, 389, 388, 395, 241.1

(56) References Cited

U.S. PATENT DOCUMENTS 5,710,760 A * 1/1998 Moll ........................... 370/249

FOREIGN PATENT DOCUMENTS

| JP | 05-30128 | 2/1993 |
| JP | 07-235929 | 9/1995 |

* cited by examiner

Primary Examiner—Wellington Chin
Assistant Examiner—Maikhanh Tran
(74) Attorney, Agent, or Firm—Katten Muchin Zavis Rosenman

(57) ABSTRACT

A test system which can verify the internal connectivity in an ATM switching system by using loopback OAM cells, without establishing any dedicated channels or using special cells newly defined for test purposes. The connectivity test system produces a loopback OAM cell containing a local subsystem identifier in a predetermined field thereof to designate a specific local subsystem in the ATM switching system as the intended loopback point. This loopback OAM cell is transmitted to the ATM switching system by a transmission unit. A response unit, disposed in each local subsystem in the ATM switching system, receives the loopback OAM cell from the transmission unit through a certain physical link, and it checks the predetermined field of the received loopback OAM cell. If the identifier found in the field agrees with the local subsystem's own identifier, the response unit sends back the received loopback OAM cell through the same link so that it will be returned to the originator via the same route.

5 Claims, 5 Drawing Sheets

FIG. 4(A)

Loopback Location ID

| FIRST SUBFIELD | SECOND SUBFIELD |
|---|---|
| ← 12 Octets → | ← 4 Octets → |
| ← 16 Octets → | |

FIG. 4(B)

Examples Of Loopback Location IDs

```
A+a = 0 0 0 0 0 0 0 0 0 0 0 1   0 0 0 1   (HEX)
A+b = 0 0 0 0 0 0 0 0 0 0 0 1   0 0 0 2   (HEX)
A+c = 0 0 0 0 0 0 0 0 0 0 0 1   0 0 0 3   (HEX)
A+d = 0 0 0 0 0 0 0 0 0 0 0 1   0 0 0 4   (HEX)
A+e = 0 0 0 0 0 0 0 0 0 0 0 1   0 0 0 5   (HEX)
A+f = 0 0 0 0 0 0 0 0 0 0 0 1   0 0 0 6   (HEX)
```

DEVICE IDENTIFIER          LOCAL SUBSYSTEM IDENTIFIER

SYSTEM FOR TESTING INTERNAL CONNECTIVITY IN ATM SWITCHING EQUIPMENT

BACKGROUND OF THE INVENTION

1. Field of the Invention

The present invention relates in general to systems for testing internal connectivity in Asynchronous Transfer Mode (ATM) switching equipment, and more particularly, to a system for testing internal connectivity within an ATM switching system by sending and receiving loopback OAM cells.

2. Description of the Related Art

For efficient and reliable operations and maintenance of ATM networks, the International Telecommunication Union-Telecommunication Sector (ITU-T) has formulated a network management scheme using OAM cells, where the term "OAM" stands for operations, administration, and maintenance. Loopback function, one of the key test capabilities provided in this scheme, uses loopback OAM cells to verify the connectivity between any two points in an ATM network.

According to the ITU-T Recommendation I.610, the loopback OAM cell has a field called "loopback location ID field" to address a specific ATM switching system at the endpoint of a connection or a segment under test, as the loopback point. Upon receiving such a loopback OAM cell through a certain physical link, each ATM switching system compares its own identifier with the loopback location ID field value of the received cell. If they coincide with each other, then the ATM switching system sends the received loopback OAM cell back to the same physical link, allowing the connectivity between the originator and the endpoint node to be verified.

Consider a situation that the ATM network encountered trouble and the connectivity test has been conducted subsequently by using loopback OAM cells to investigate the point of failure. This test can indicate which ATM switching system is faulty; however, it is unable to tell which internal subsystem or component is defective in that ATM switching system.

To test whether the ATM cells are being relayed properly by each part of the target ATM switching system, it is necessary to establish some dedicated test channels or newly define some special cells for this purpose. However, such dedicated test channels would lead to the degradation in service quality, because it consumes some channels and thus reduces the network bandwidth available to users. The use of special test cells, on the other hand, needs efforts to revise the relevant standards to introduce new definitions, and also requires additional software development so that the existing ATM switches will be able to handle the new cells in conformity with the standards.

SUMMARY OF THE INVENTION

Taking the above into consideration, an object of the present invention is to provide a system which can test the internal connectivity in an ATM switching system without establishing any dedicated channels or using special cells for the test purposes.

To accomplish the above object, according to the present invention, there is provided a system for testing internal connectivity in an ATM switching system by using loopback OAM cells, where the ATM switching system contains a plurality of local subsystems. This system comprises: a transmission unit which transmits a loopback OAM cell containing a local subsystem identifier in a predetermined field thereof to indicate one of the local subsystems constituting the ATM switching system; and a response unit, disposed in each local subsystem and activated when the loopback OAM cell is received from the transmission unit, which returns the received loopback OAM cell if the identifier found in the predetermined field of the received loopback OAM cell agrees with the local subsystem's own identifier.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4(A) is a diagram which shows the structure of "loopback location ID" field;

FIG. 4(B) is a diagram which shows several examples of the loopback location ID.

DESCRIPTION OF THE PREFERRED EMBODIMENTS

Two embodiments of the present invention will be described below with reference to the accompanying drawings.

Figure 1:
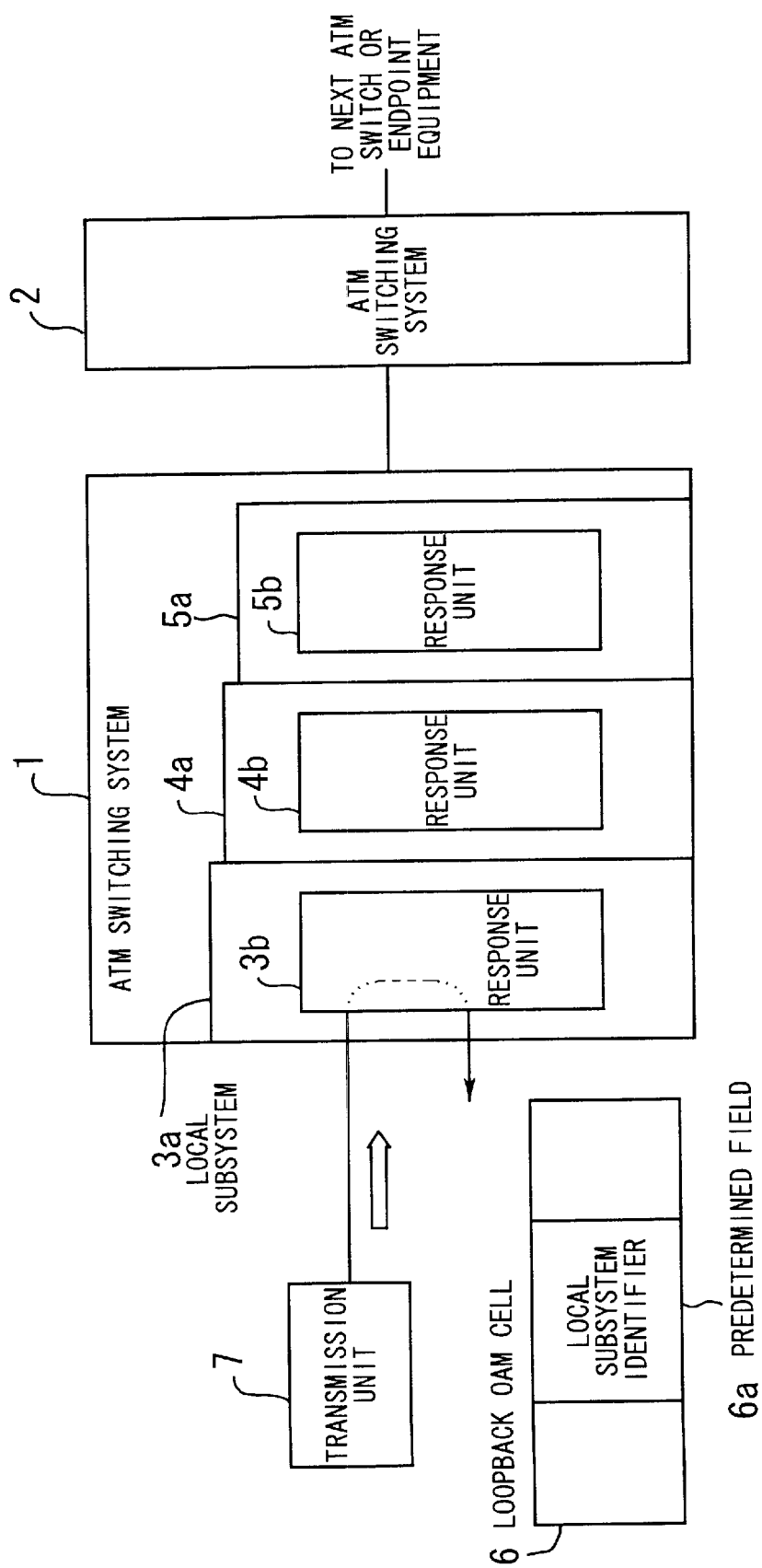
FIG. 1 is a conceptual view of the present invention.

Referring first to FIG. 1, the following section explains the concept of a first embodiment of the present invention. FIG. 1 shows two ATM switching systems 1 and 2, each containing a plurality of local subsystems 3a, 4a, and 5a with unique identifiers to distinguish themselves from each other. According to the first embodiment of the present invention, the system comprises: a transmission unit 7 and response units 3b, 4b, and 5b. The transmission unit 7 is designed to transmit a loopback OAM cell 6 having a specific identifier in a predetermined field 6a to indicate one of the local subsystems (say, the subsystem 3a). The response units 3b, 4b, and 5b are disposed in the individual local subsystems 3a, 4a, and 5a, respectively, and activated when the loopback OAM cell 6 is received from the transmission unit 7. Each response unit is configured to return the received loopback OAM cell to its originator if the identifier found in the predetermined field 6a of the received loopback OAM cell 6 agrees with that local subsystem's own identifier.

While loopback OAM cells are used, in the present invention, to test the internal connectivity within an ATM switching system, their basic format conforms to the ITU-T Recommendation I.610. More specifically, the originator forms a loopback OAM cell 6 by filling in its predetermined field 6a with the identifier of a specific local subsystem (e.g., the subsystem 3a, 4a, or 5a) which is the intended point of loopback, and the transmission unit 7 sends this loopback OAM cell 6 to the ATM switching system 1. With respect to the predetermined field 6a, the "loopback location ID" field defined in the I.610 standard is the most preferable place to enter the local subsystem's identifier. The local subsystems 3a, 4a, 5a are integral part of the ATM switching system 1, such as link interface units connected to remote stations or each ATM switch fabric of a multi-stage ATM switching system.

The local subsystems 3a, 4a, and 5a have their respective response units 3b, 4b, and 5b. Suppose, for instance, that the response unit 3b has received a loopback OAM cell 6 from the transmission unit 7 through one of the links that extend from the ATM switching system 1 to other nodes. Then the response unit 3b checks the predetermined field 6a of the received loopback OAM cell 6. Only when the predetermined field 6a indicates the local subsystem 3a's own identifier, the response unit 3b sends back the loopback OAM cell 6 through the same link so that the cell will be returned to the originator via the same route. The other response units 4b and 5b will operate in the same way as above when they received loopback OAM cells.

As described above, the ATM switching system 1 is configured to return the received loopback OAM cell 6, separately at each local subsystem 3a, 4a, or 5a. By seeing the returned (or missing) loopback OAM cell 6, the originator, or the sender of the cell, can grasp the individual status of the local subsystems 3a, 4a, and 5a of the ATM switching system 1 under test. Therefore, the proposed system allows the internal connectivity within the ATM switching system 1 to be validated without establishing any dedicated test channels or using special cells defined for the test purposes.

Figure 2:
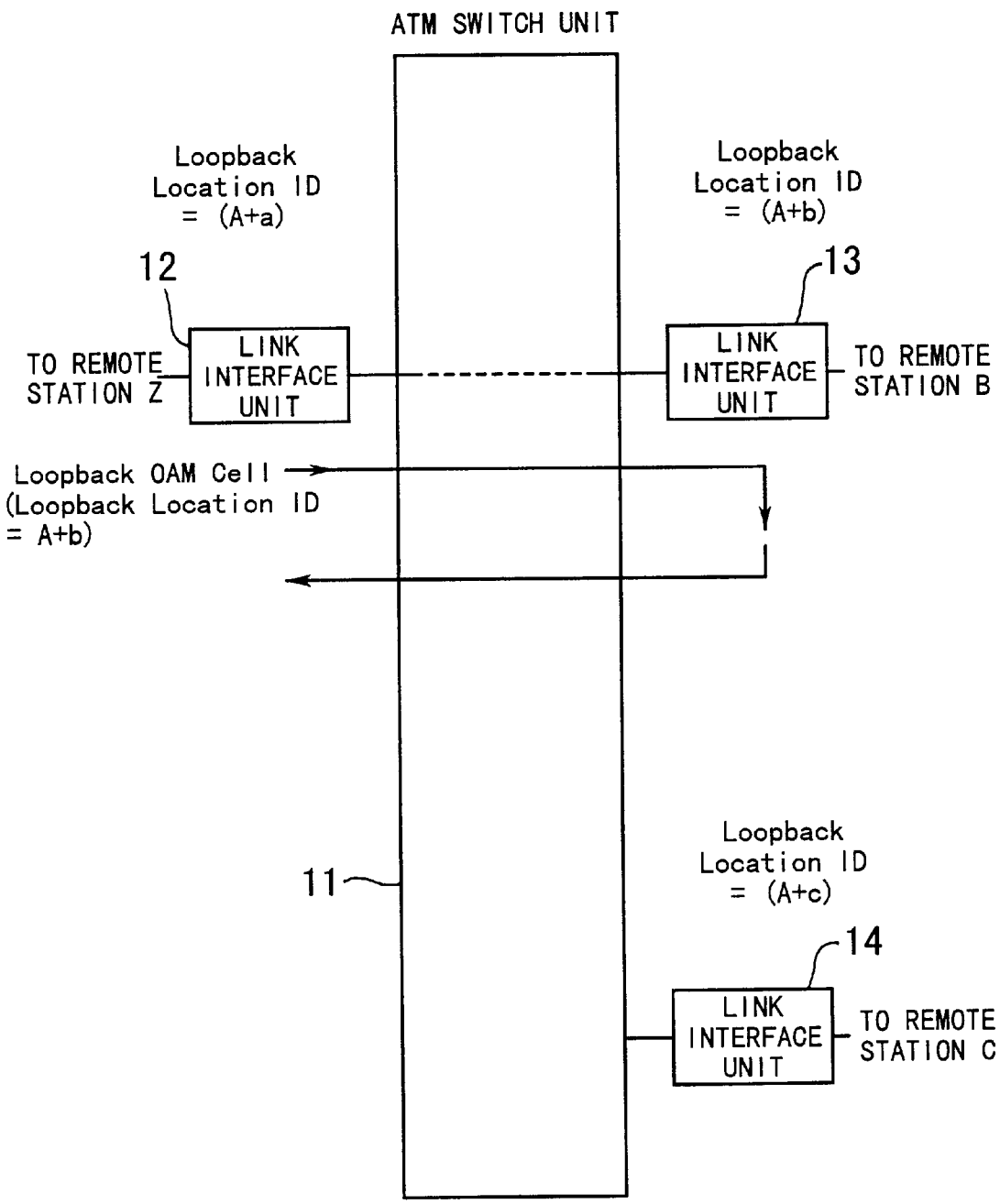
FIG. 2 is a block diagram of an ATM switching system which employs a local connectivity testing system according to a first embodiment of the present invention.

Now the first embodiment of the present invention will be described in more detail below. FIG. 2 is a block diagram of an ATM switching system that employs a local connectivity testing system according to the first embodiment of the present invention. This ATM switching system comprises an ATM switch unit 11 for routing ATM cells and link interface units 12, 13, and 14 which have their respective response units equivalent to the response units 3b, 4b, and 5b explained in FIG. 1. The link interface units 12, 13, and 14 have a processor comprising a CPU, ROM, RAM, and other components. The aforementioned features of the response units are actually implemented as the functions provided by this processor. The link interface units 12, 13, and 14 serve as dedicated interfaces to communicate with remote stations Z, B, and C, respectively. Each link to those remote stations actually contains a plurality of communication channels.

In general, ATM switching systems are under the control of system administrators who operate and manage the system, including the assignment of device identifiers to each switch. For illustrative purposes, it is assumed here that the ATM switching system of FIG. 2 has a unique device identifier "A" previously assigned by such a system administrator. Furthermore, in the present invention, the link interface units 12, 13, and 14 have their own local subsystem identifiers "a," "b," and "c," respectively, to uniquely distinguish themselves from each other. Instead of defining the local subsystem identifiers on an individual link interface basis as in the present example, it is also possible to assign them to smaller portions such as individual communication channels under the control of each link interface unit.

Having established the above identifiers, the proposed test system is ready to transmit a loopback OAM cell to the target ATM switching system in response to a connectivity test command from an external source. The next section will now present the details of loopback OAM cells with reference to FIG. 3.

Figure 3:
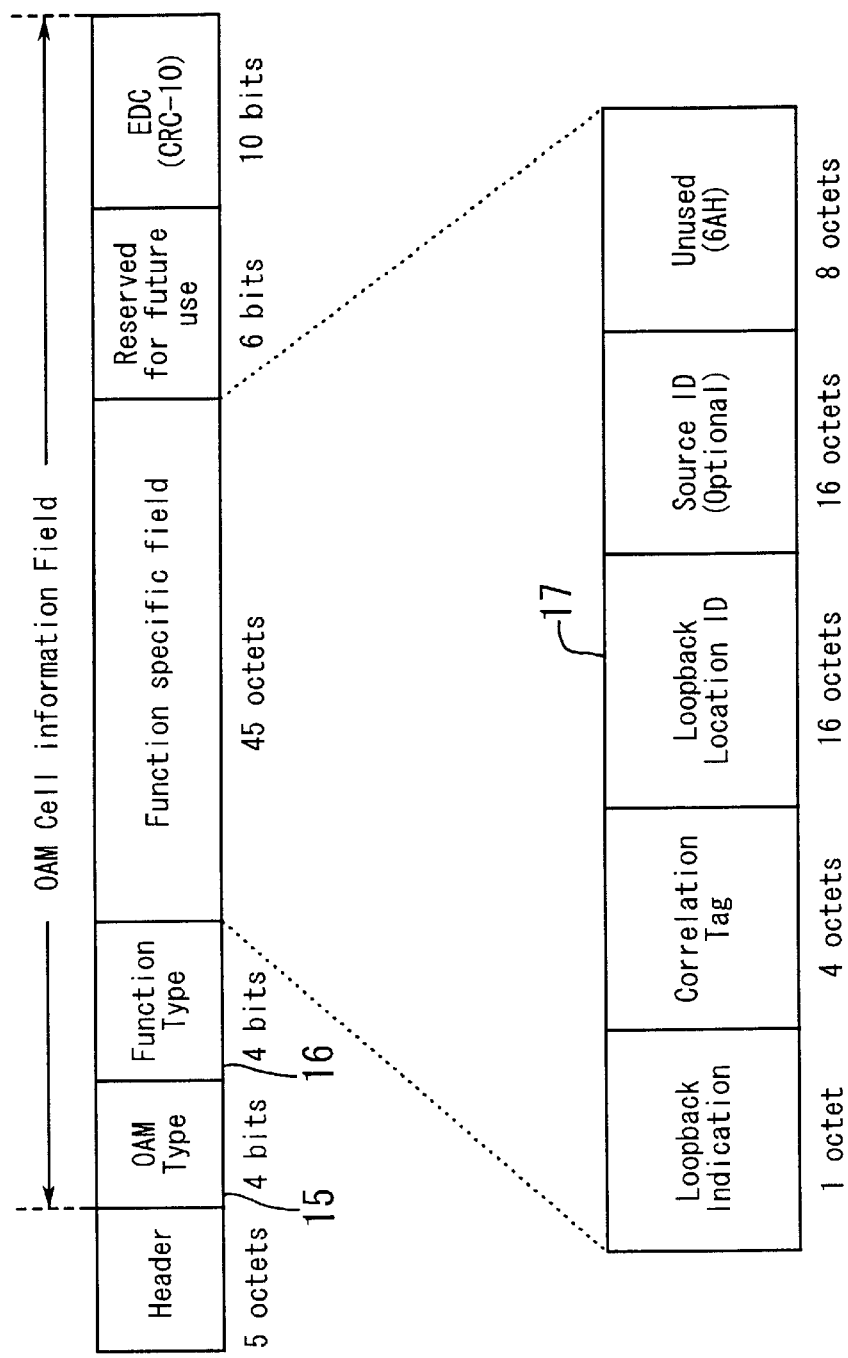
FIG. 3 is a diagram which shows the format of loopback OAM cells.

FIG. 3 is a diagram which shows the format of loopback OAM cells. According to the loopback OAM cell definitions in ITU-T I.610, the cells contain some specific codes to appropriate part of the "OAM cell information field" as illustrated in FIG. 3. More specifically, the "OAM Type" field 15 has a code to indicate "Fault Management" OAM functions, and the "Function Type" field 16 represents "Loopback" function type. The "loopback location ID" field 17, as part of the 45-octet function specific field, is the place where the loopback point is designated. That is, an ATM switching system which has received a loopback OAM cell examines this "loopback location ID" field 17 to determine whether its own identifier is designated or not, and only when the field value specifies that ATM switching system as the intended loopback point, it sends the received OAM cell back to the originator via the same link. As such, the "loopback location ID" field 17 is used to specify the destination of loopback OAM cells.

The present invention extends the usage of the "loopback location ID" field 17 to designate not only an individual ATM switching system, but also its local subsystems. FIG. 4(A) shows the structure of this "loopback location ID" field in the present invention, while FIG. 4(B) shows several specific examples of the field value.

The "loopback location ID" field is a 16-octet data field shown in FIG. 4(A), being divided into the first twelve octets and the remaining four octets. These two parts are referred to as the first and second subfields. The first subfield holds the device identifier (e.g., "A") assigned to each ATM switching system on the network, and the second subfield represents the identifier (e.g., "a," "b," and "c") of a local subsystem contained in the ATM switching system designated by the first subfield. The loopback location ID used in the present invention is actually a combination of these two field values.

FIG. 4(B) shows some specific loopback location IDs. The first three IDs are used in the first embodiment (FIG. 2), each of which consists of a common device identifier value ("All") of "000000000001" in hexadecimal (Hex) notation and a unique local subsystem identifier value ("a," "b," or "c") of "0001," "0002," or "0003" also in hexadecimal notation. The remaining three IDs will appear in a later section that explains a second embodiment of the present invention. Their local subsystem identifier values, represented by the symbols "d," "e," and "f," are "0004," "0005," and "0006," respectively.

Referring back to FIG. 2, assume that the illustrated ATM switching system has received a loopback OAM cell with a loopback location ID "A+b" of "000000000001 0002" (Hex) from a remote station named "Z." In this situation, the link interface unit 12 first checks the "loopback location ID" field of the received loopback OAM cell. Although the first subfield agrees with the device identifier "A" of the ATM switching system, the second subfield value "b" is different from the link interface unit 12's own local subsystem identifier "a.". Upon recognition of this fact, the link interface unit 12 passes this loopback OAM cell to the ATM switch unit 11, which is designed to route every loopback OAM cell to all the links available. In the present example, the cell is fed to the link interface units 13 and 14.

When the loopback OAM cell is received from the ATM switch unit 11, the link interface unit 13 checks its "loopback location ID" field. Since the first subfield agrees with the ATM switching system's device identifier "A" and the second subfield coincides with the link interface unit 13's own local subsystem identifier "b," the link interface unit 13 returns this loopback OAM cell so that the cell will reach the originator via the same route. The link interface unit 14 performs the same process as the link interface unit 12 does.

As a result, the originator receives a replica of the loopback OAM cell from the intended destination, which indicates that the path from the originator to the link interface unit 13 in the ATM switching system of FIG. 2 is working properly, or capable of delivering ATM cells. By repeating the above connectivity test with various loopback location IDs, the originator can identify the boundary between reachable nodes and unreachable nodes, thereby locating the point of failure.

In the present example of FIG. 2, the originator of loopback OAM cells may be, for example, a management console for maintenance and monitoring control (not illustrated), the remote station Z, the link interface unit 12, or other equipment deployed at somewhere on the side of the remote station Z. The loopback OAM cells, however, can be sent from anywhere in the network. Further, they may reach the ATM switching system of FIG. 2 not only from the left-hand side of the drawing, but also from the right-hand side, since the link interface units 12, 13, and 14 are capable of bidirectional data flow for loopback, as part of the functions of their respective response units. That is, each link interface unit has two bidirectional ports, either of which can accept and return the loopback OAM cells.

The next section will now present a second embodiment of the present invention.

Figure 5:
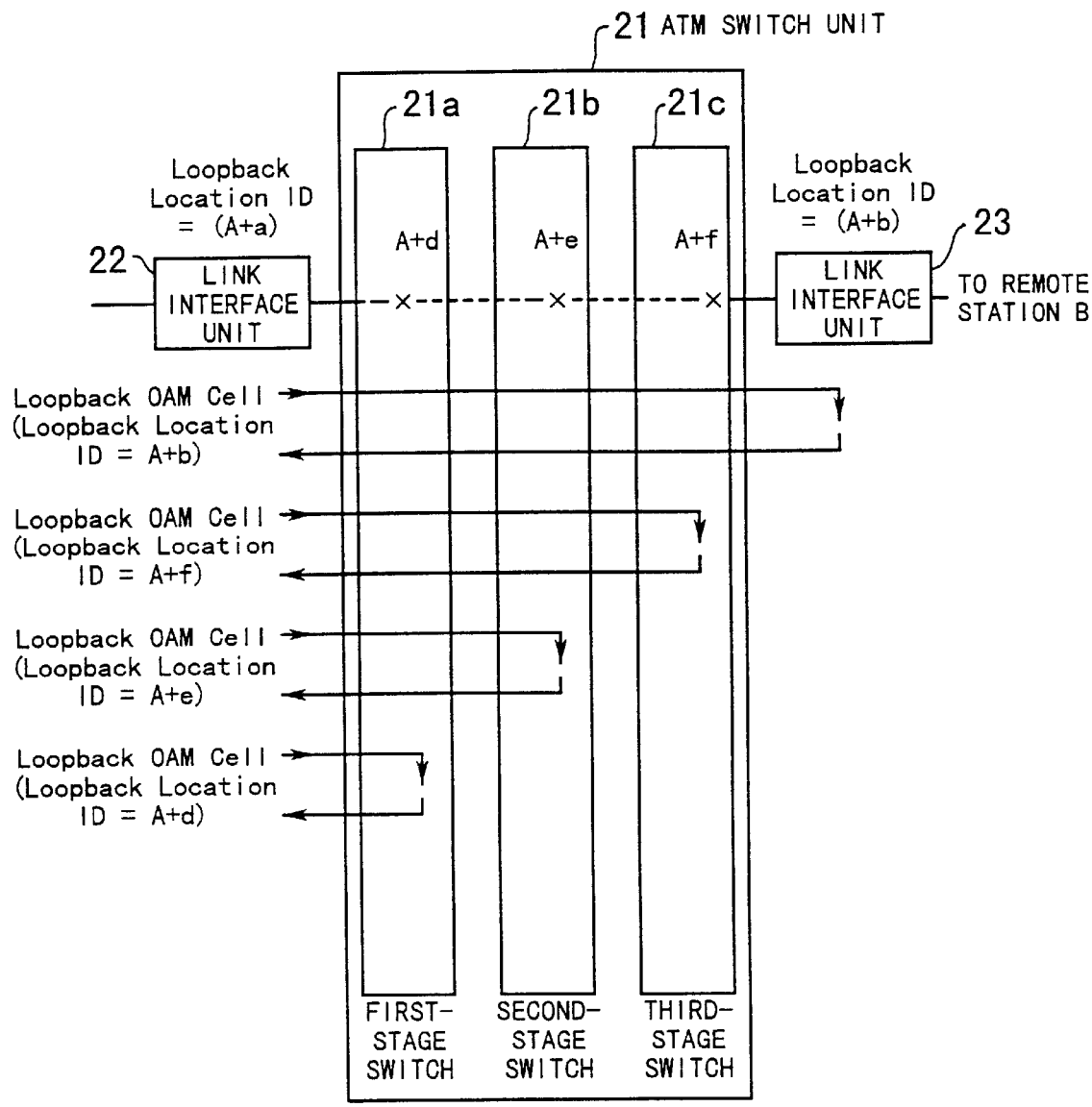
FIG. 5 is a block diagram of an ATM switching system which employs an internal connectivity testing system of a second embodiment of the present invention.

FIG. 5 is a block diagram of an ATM switching system employing a local connectivity testing system according to a second embodiment of the present invention. This ATM switching system comprises a multi-stage ATM switch unit 21 and link interface units 22 and 23. The ATM switch unit 21 contains a first-stage switch 21a, a second-stage switch 21b, and a third-stage switch 21c.

In this second embodiment, the response units (FIG. 1) are implemented in the link interface units 22 and 23 and the first to third-stage ATM switches 21a, 21b, and 21c. All those link interface units and switches employ a m processor organized by a CPU, ROM, RAM, and other components to provide them with the functionalities of a response unit.

Suppose here that the ATM switching system of FIG. 5 has a device identifier "A," while the link interface units 22 and 23 have local subsystem identifiers "a" and "b," respectively. Further, different local subsystem identifiers "d," "e," and "f" have been assigned to the first to third-stage ATM switches 21a, 21b, and 21c, respectively.

Having established the above identifiers, the present connectivity test system transmits loopback OAM cells to the target ATM switching system in response to a connectivity test command from an external source. The second embodiment follows the format of loopback OAM cells and loopback location IDs described in the first embodiment (see FIGS. 3 and 4).

Suppose that a loopback OAM cell with a loopback location ID "A+b" ("000000000001 0002" in Hex) has reached the link interface unit 22 in the ATM switching system of FIG. 5. Upon receipt of the loopback OAM cell, the link interface unit 23 checks the "loopback location ID" field of the received cell. Since the first subfield agrees with the ATM switching system's device identifier "A" and the second subfield coincides with its own local subsystem identifier "b," the link interface unit 23 returns this loopback OAM cell to the originator through the same link.

Suppose here that another loopback OAM cell with a loopback location ID "A+f" ("000000000001 0006" in Hex) has entered the ATM switching system through the link interface unit 22. Upon receipt of the loopback OAM cell, the third-stage switch 21c checks the "loopback location ID" field of the received cell. Since the first subfield agrees with the ATM switching system's device identifier "A" and the second subfield coincides with the local subsystem identifier "f" of its own, the third-stage switch 21c returns this loopback OAM cell to the originator via the same link.

Suppose now that still another loopback OAM cell with a loopback location ID "A+f" ("000000000001 0005" in Hex) has entered the ATM switching system through the link interface unit 22. Upon receipt of the loopback OAM cell, the second-stage switch 21b checks the "loopback location ID" field of the received cell. Since the first subfield agrees with the ATM switching system's device identifier "A" and the second subfield coincides with the local subsystem identifier "e" of its own, the second-stage switch 21b sends this loopback OAM cell back to the originator via the same link.

Suppose again that still another loopback OAM cell with a loopback location ID "A+d" ("000000000001 0004" in Hex) has entered the ATM switching system through the link interface unit 22. Upon receipt of the loopback OAM cell, the first-stage switch 21a checks the "loopback location ID" field of the received cell. Since the first subfield agrees with the ATM switching system's device identifier "A" and the second subfield coincides with the local subsystem identifier "d" of its own, the first-stage switch 21a sends this loopback OAM cell back to the originator via the same link.

As a result, the originator receives several replicas of the transmitted loopback OAM cells. This allows the originator to identify the boundary between reachable units and unreachable units, thus locating the point of failure.

The above discussion is summarized as follows. According to the present invention, a predetermined data field of the existing loopback OAM cell is arranged to contain the identifier of a specific local subsystem in an ATM switching system under test, while each local subsystem in the ATM switching system is configured to test every incoming loopback OAM cell to find the one having the predetermined field value that agrees with its own local subsystem identifier. If such a cell is found, the subsystem will respond to the cell by sending it back to its origin through the same link. Therefore, it is possible to evaluate the internal connectivity within the ATM switching system without using any dedicated channels or special cells for the test purposes.

Because it is not necessary to reserve any to dedicated test channels, the proposed system improves the usage of available network bandwidth. Further, the proposed system does not require any special cells to be newly defined for the connectivity test, and therefore, it is not necessary to develop additional software to adapt the ATM switching system to the new cells.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A system for testing internal connectivity within an ATM switching system on an ATM network by using loopback OAM cells, the ATM switching system containing a plurality of local subsystems including link interface units and ATM switch fabrics, the system comprising:

transmission means for transmitting a loopback OAM cell containing a local subsystem identifier in a predetermined field thereof to indicate one of the local subsystems constituting the ATM switching system; and responding means, disposed in each local subsystem and activated when the loopback OAM cell is received from said transmission means, for returning the received loopback OAM cell if the identifier found in the predetermined field of the received loopback OAM cell agrees with said each local subsystem's own identifier; wherein said transmission means places a device identifier of the ATM switching system to the predetermined field, along with the identifier indicative of the one of the local subsystems constituting the ATM switching system, and transmits the loopback OAM cell, and said responding means returns the received loopback OAM cell if the predetermined field holds both the local subsystem's own local subsystem identifier and the ATM switching system's own device identifier.

2. The system according to claim 1, wherein the predetermined field is a loopback location ID field.

3. The system according to claim 1, wherein said responding means has two bidirectional ports, either of which can receive the loopback OAM cell and return the received loopback OAM cell.

4. A system for testing internal connectivity within an ATM switching system on an ATM network by using loopback OAM cells, the ATM switching system containing a plurality of local subsystems including link interface units and ATM switch fabrics, the system comprising:

transmission means for transmitting a loopback OAM cell containing a local subsystem identifier in a predetermined field thereof to indicate one of the local subsystems constituting the ATM switching system; and responding means, disposed in each local subsystem and activated when the loopback OAM cell is received from said transmission means, for returning the received loopback OAM cell if the identifier found in the predetermined field of the received loopback OAM cell agrees with said each local subsystem's own identifier; wherein a plurality of said link interface units connected to a single ATM switch fabric to system organize one of the local subsystems constituting the ATM switching system.

5. The system according to claim 1, wherein said ATM switching system is a multi-stage switching system containing a plurality of ATM switches and the individual ATM switches are regarded as the local subsystems of the ATM switching system.

* * * * *